Patented June 2, 1936

2,042,974

UNITED STATES PATENT OFFICE 2,042,974

MEANS FOR KEEPING CUT FLOWERS FRESH

Johannes Weissflog, Ludwigshafen-on-the-Rhine, Germany, assignor to Winthrop Chemical Company, Inc., New York, N. Y., a corporation of New York No Drawing. Application January 17, 1935, Serial No. 2,225. In Germany January 24, 1934

10 Claims. (Cl. 47—1)

The present invention relates to means for keeping cut flowers and the like fresh.

It has already been proposed to keep cut flowers and the like fresh by adding to the water, in which the flowers are kept, a material which consists of combinations of two or more substances of which at least one is a nutrient, for example cane sugar, levulose, glucose, and other kinds of sugars, and at least one is a substance preventing putrefaction or eliminating its effects, for example water-soluble salts of the metals silver and copper, potassium permanganate, charcoal or chloroform.

I have now found that organic nitrogen compounds wherein at least one aliphatic hydrocarbon radicle containing at least 4 carbon atoms, preferably 10 to 18 carbon atoms, is attached to nitrogen are especially suitable as means for preventing putrefaction in the above mentioned combination. Compounds of the said kind, for instance, are aliphatic amines, the substitution products thereof as well as alkyl-, or aryl- or aralkyl-substituted ammonium bases which may be employed as such or in the form of salts of inorganic or organic acids, such as, for example, hydrochloric acid or acetic acid. As compared, for example, to the water-soluble silver salts hitherto used, these compounds involve the advantage that no turbidity of the water by the formation of silver chloride owing to the presence of chlorine ions in the water and no sedimentation of dark colored precipitates takes place. Another advantage consists in the fact that the said organic nitrogen compounds are not incompatible with the plant, and that their decomposition products may even be important nutritive and plant-building substances. The said compounds may also be employed in admixture with one another or together with metals or metal salts, for example, with a complex salt containing an amine and silver, or with other substances having an antiseptic action, such as, for example, formaldehyde, formaldehyde polymerization products or hydrogen peroxide.

Under the term "organic nitrogen compounds of the said kind" I understand also the derivatives of these compounds and their salts.

The following examples serve to illustrate the invention, but the latter is not restricted thereto.

Example 1

A mixture of 17 grams of cane sugar and 0.1 gram of dodecylamine hydrochloride is dissolved in 1 liter of water. When placed in this solution large-flowered chrysanthemums, which in ordinary water are preserved only 5 to 7 days, retain their freshness for from 12 to 14 days. Stalks of toadflax are preserved in the same solution for from 8 to 10 days, instead of for from 4 to 5 days in ordinary water. In a solution which in addition to grape sugar still contains 0.01 per cent of dodecylisopropylamine, phlox is kept fresh for 8 days, instead of for 5 days in ordinary water.

Example 2

In a solution which contains 1.7 per cent of cane sugar and 0.1 per cent of dimethylbenzyldodecylammonium chloride dissolved in water, flower stalks of *Poinsettia pulcherrima* retain their freshness for from 6 to 8 days, whereas when placed in ordinary water both the colored bracts and the green leaves become loose and unsightly after 3 days.

Example 3

In a solution which for each liter contains 17 grams of cane sugar and 0.05 gram of dimethyldodecyltrichlorbenzylammonium chloride, the flower stalks of larkspur are kept fresh for 10 days and more, while when placed in ordinary water the blossoms fall off and fade away after 4 to 5 days.

What I claim is:

1. A composition of matter suitable for keeping cut flowers and the like fresh when added to the water in which the flowers etc. are kept, consisting of a combination of substances compatible with the flowers, etc. of which at least one is a nutrient and at least one is a substance preventing putrefaction or eliminating its effects, said second mentioned substance being an organic nitrogen compound wherein at least one aliphatic hydrocarbon radicle containing at least 4 carbon atoms is attached to nitrogen.

2. A composition of matter as claimed in claim 1 in which the substance preventing putrefaction or eliminating its effects is selected from the group consisting of aliphatic amines, substitution products thereof, alkyl-, aryl- and aralkyl-substituted ammonium bases and substitution products thereof.

3. A composition of matter as claimed in claim 1 in which the substance preventing putrefaction or eliminating its effects is dodecylamine.

4. A composition of matter as claimed in claim 1 in which the substance preventing putrefaction or eliminating its effects is a dialkylaralkyldodecylammonium base.

5. A composition of matter as claimed in claim 1 in which the substance preventing putrefaction or eliminating its effects is an aliphatic amine containing from 10 to 18 carbon atoms.

6. A composition of matter as claimed in claim 1 in which the substance preventing putrefaction or eliminating its effects is a dialkylaralkyldodecylammonium hydroxide containing from 10 to 18 carbon atoms.

7. A composition of matter as claimed in claim 1 in which the substance preventing putrefaction or eliminating its effects is dimethylbenzyldodecylammonium hydroxide.

8. A composition of matter as claimed in claim 1 in which the substance preventing putrefaction or eliminating its effects is a substituted dialkylaralkyldodecylammonium base.

9. A composition of matter as claimed in claim 1 in which the substance preventing putrefaction or eliminating its effects is a substituted dialkylaralkyldodecylammonium base, containing from 10 to 18 carbon atoms.

10. A composition of matter as claimed in claim 1 in which the substance preventing putrefaction or eliminating its effects is dimethyldodecyltrichlorbenzylammonium hydroxide.

JOHANNES WEISSFLOG.